Figures 1, 2:
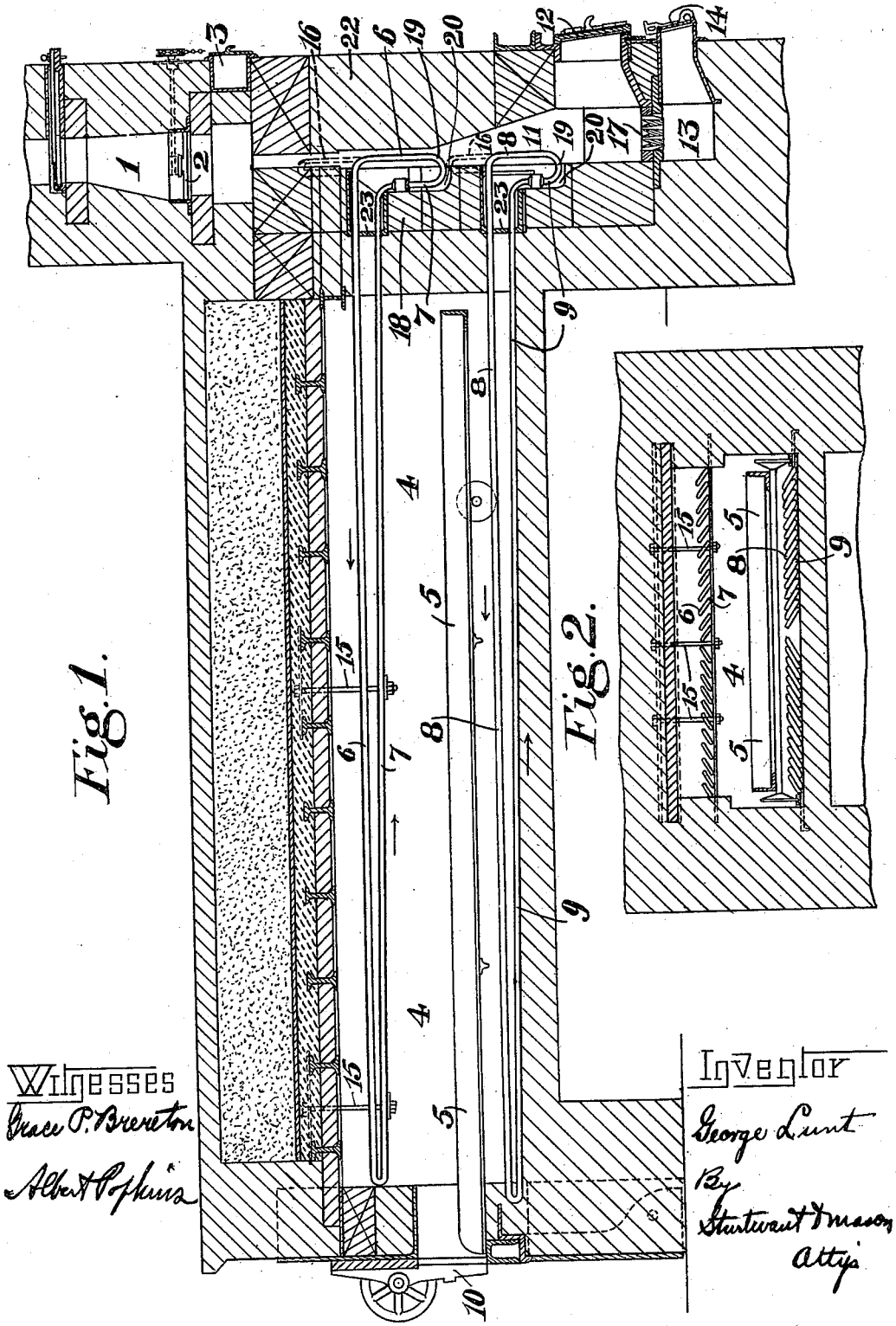

G. LUNT.
STEAM PIPE OVEN.
APPLICATION FILED JULY 10, 1909.

981,443.

Patented Jan. 10, 1911.
4 SHEETS—SHEET 1.

Witnesses
Grace P. Brereton
Albert Hopkins

Inventor
George Lunt
By
Sturtevant & Mason
Attys

G. LUNT.
STEAM PIPE OVEN.
APPLICATION FILED JULY 10, 1909.
981,443.
Patented Jan. 10, 1911.
4 SHEETS—SHEET 2.
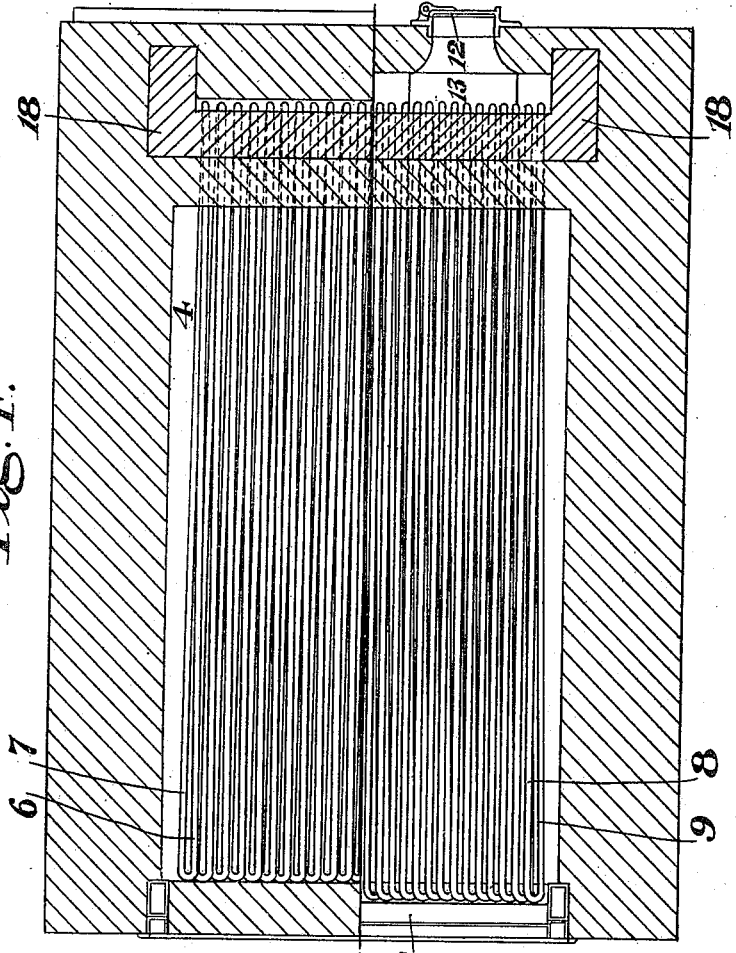
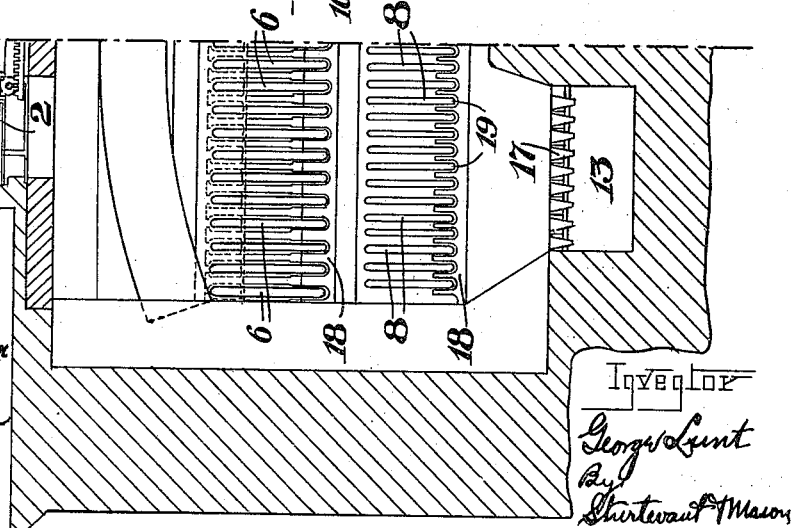

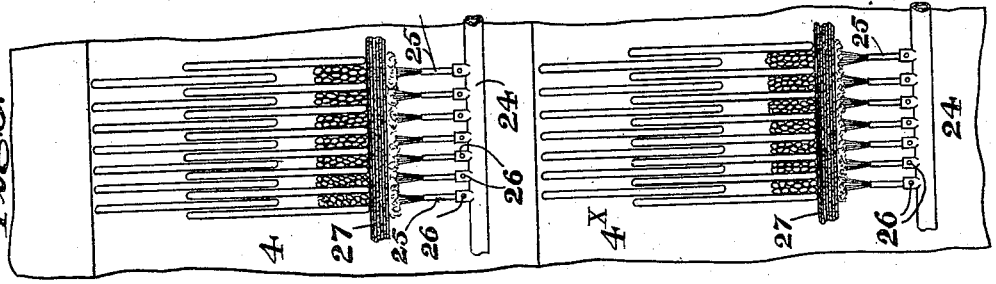
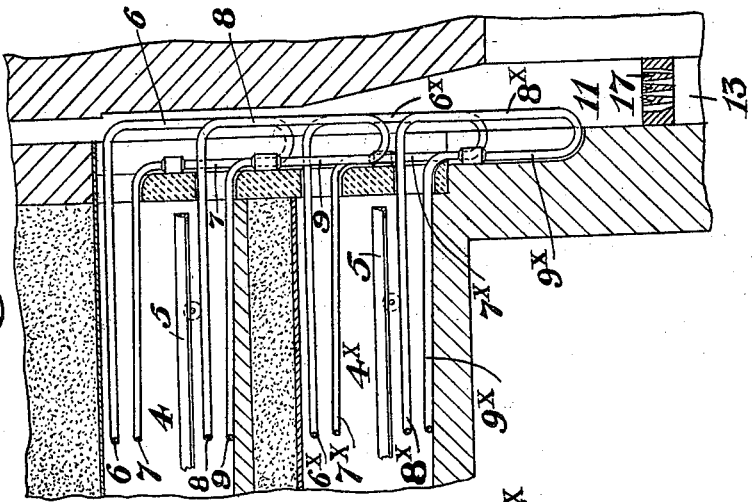
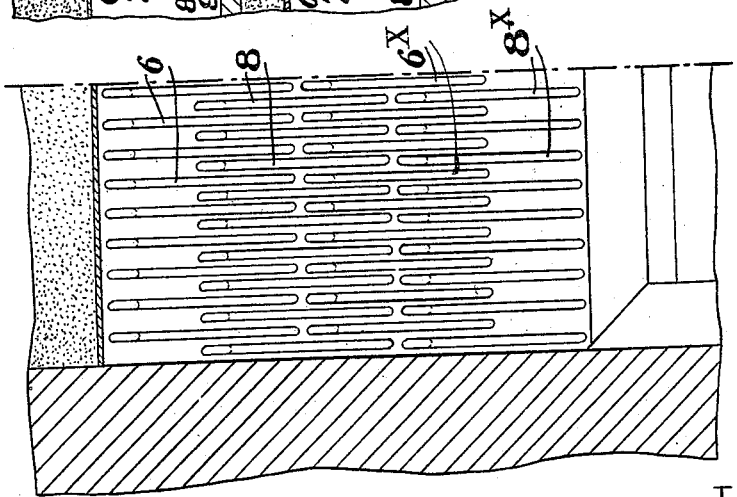

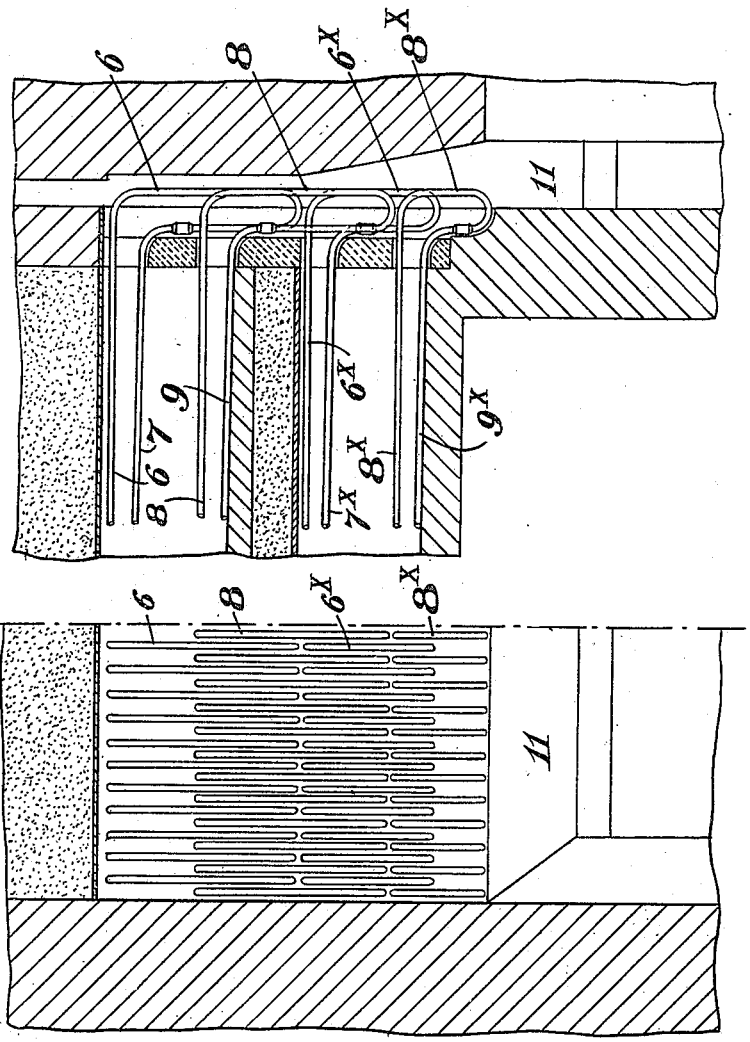

UNITED STATES PATENT OFFICE.

GEORGE LUNT, OF FORMBY, NEAR LIVERPOOL, ENGLAND.

STEAM-PIPE OVEN.

981,443.         Specification of Letters Patent.    Patented Jan. 10, 1911.

Application filed July 10, 1909.  Serial No. 506,926.

*To all whom it may concern:*

Be it known that I, GEORGE LUNT, a subject of the King of Great Britain, residing at Formby, near Liverpool, in the county of Lancaster, in the Kingdom of England, have invented certain new and useful Improvements in Steam-Pipe Ovens, of which the following is a specification.

This invention relates to improvements in baking and other ovens of the kind known as steam pipe ovens, wherein the heating of the oven chamber is effected by closed steam pipes made up of flow and return tubes, partially filled before their final closure with water or other fluid.

In the accompanying drawings:—Figure 1 is a longitudinal section through a steam pipe oven and furnace; Fig. 2, a cross section through the front end of the oven showing the ends of the steam pipes; Fig. 3, a half cross section through the furnace chamber; Fig. 4, a sectional plan view, half of which shows the top steam pipes, and the other half the bottom steam pipes; Fig. 5, a part longitudinal section of a two deck oven with my invention applied thereto; Fig. 6, a front view thereof with front wall removed; Figs. 7 and 8 are similar views to Figs. 5 and 6 of a modification; Fig. 9 is a detail view of the heating arrangement.

Referring first to Figs. 1 to 4, 1 is the uptake, 2 its damper, 3 soot door, 4 the baking chamber, 5 its baking plate, 6 and 7 the top set of steam tubes, 8 and 9 the bottom set, 10 the oven door, 11 the combustion chamber, 12 its doors, 13 the ash pit, 14 its door, and 15 the hangers by which the upper set of tubes 6 and 7 are suspended.

The two sets of pipes 6, 7, and 8, 9, which are partially filled with water or other liquid before final closure, are arranged to project at one end into the combustion chamber 11. The pipes are made up of flow tubes 6 and 8 and return tubes 7 and 9, joined or welded together at the ends to form continuous pipes, so that a constant circulation of fluid while heated by the combustion chamber is set up within them, and thus the heating of these pipes is equal or nearly so throughout their entire length. Hitherto these flow pipes 6 and 8 rose upward throughout their entire distance from the furnace, while the return lengths 7 and 9 sloped more or less abruptly back to the furnace. The action was this, that the heating of the water by the furnace in the pipes lessened its density, so that the heated water therein drove the water in front of it, through the rest of the circuit back to the furnace. The water in the pipes immediately it left the place where it was heated by the fire began of course to cool, and as the flow pipe sloped upward for its entire length, the water, though becoming cooler all the time, had to travel up-hill, consequently the circulation was, comparatively speaking, slow in its action, the object being apparently to secure a permanence of circulation, rather than a rapid circulation. This of course was disadvantageous, because with a slow circulation the end of the circuit remote from the furnace was bound to be of considerably lower temperature than the end where the furnace was located. Now it will be seen from the drawings (Fig. 1), that to avoid this defect, I cause the flow pipes 6 and 8 to rise upward in a vertical column through the furnace 11, then be bent laterally and descend through wall of the oven chamber 4 by a gentle slope to the front end of the said chamber while the return lengths 7 and 9 slope approximately the same or at a greater or less declivity back to the combustion chamber 11. Consequently it is only the portion of the pipes which is acted upon by the heat of the fire in the chamber 11 that rise upward, all the rest of the circuit sloping downward, my object being this, namely, to enable the action of gravity to come into play directly the pipes leave the furnace or flue 11, where they are directly acted upon by the heat, then when clear of the furnace to descend if required, instead of rising upward, as hitherto. This descent induces a more rapid circulation of the fluid. If desired, I may cause the flow pipes 6 and 8 to rise upward in a vertical column through the furnace 11, then descend abruptly downward for a short distance as shown by the dotted lines 16, (Fig. 1) and then descend by a gentle slope as shown by the full lines to the end of the oven chamber, or, if preferred, the flow lengths 6 and 8 can be horizontal. At the bottom of the combustion chamber 11 is the grate 17.

In the arrangement shown, I make the lower lengths 7 and 9 of the device at the combustion chamber end to descend more or less abruptly downward through the brickwork 18, and at the bottom joins that part of the flow lengths 6 and 8, that pass upwardly through the chamber, the joint being made with a gentle curve; then the pipes pass vertically upward through the chamber to the flow lengths 6 and 8, the bends 19 being made with a gentle curve. 20 is a series of grooves in the wall 18 that separate the furnace from the oven, and on the furnace side thereof. These grooves are so made that the lower or return lengths 7 and 9 of the pipes which slope more or less abruptly downward at the ends will lie in these grooves while the parts 6 and 8 which pass upward to the flow or upper lengths lie directly in the furnace 11 clear of the grooves. The advantage of this arrangement is that should any individual pipe burst, it can be more easily withdrawn for renewal or repair, because the bent down parts of the device lie in the grooves 20 on the furnace side of the brickwork, and consequently there is nothing to obstruct the entire device being drawn out longitudinally through the hollow saddles 23, if the outer furnace wall 22 be taken down, or a door therein be opened.

The combustion chamber 11 can be wider at or near the bottom than at the top, i. e. part way up the combustion chamber 11 narrows considerably and the rest of its length is much narrower so as to confine the heat around the upper set of tubes 6. The result of this is that the heat as it gets farther away from the furnace grate is more and more concentrated around the tube 6.

The upper set of tubes 6, 7, at their vertical ends dip down into close proximity with the vertical ends of the lower length 8, 9, so that the heat produced by combustion will first come into contact with the ends of the lower set of tubes 8, 9, and then with the ends of the upper set of tubes 6, 7. The parts of the pipes, which are bent vertically upward, from the return to the flow lengths pass through the furnace 11 in the direction of its length. Consequently they can be made of any length desired to secure the desired heating surface. This is a very important desideratum because in the ordinary steam pipe oven, the ends of the steam pipes can project into the furnace only a very few inches, and the heating surface is limited to this, while my pipes pass along the furnace 11 in the direction of its height any distance, and so can have a heating surface many times greater than the ordinary straight steam pipe.

There are by preference a larger number of pipes in the lower set than there are in the upper set, as shown in Figs. 2, 3 and 4.

A convenient plan of imparting to the pipes a slope throughout their length is as follows:—I first make the portions of the flow and return lengths of the tubing that pass through the oven chamber horizontal and parallel, and I then impart to the said parallel portions a twist, in such manner that while in end view (Fig. 3) at the combustion chamber end, they are upright, in end view at the other end they lie in diagonal or sloping planes (Fig. 2). This twist gives a fall to both the flow and return lengths, without reducing the radius of the bend at the front ends. This plan also facilitates the welding or joining together of the ends of the pipes. The twist is shown also in the plan view (Fig. 4).

Figs. 5 and 6 show a double deck oven in which 4, $4^x$, are two braking chambers placed in a tier, and each provided with an oven plate 5 with two sets of steam pipes 6, 7, and 8, 9; $6^x$ $7^x$ and $8^x$ $9^x$. In other respects the arrangement is similar, and the same letters of reference refer to like parts as in the preceding figures. In this arrangement however the upper set of tubes 6, 7, at their vertical ends, dip down into close proximity with the upper set of tubes $6^x$ $7^x$, while the lower set of tubes 8, 9, at their vertical ends dip down into close proximity with the vertical ends of the other lower set $8^x$ $9^x$. For this purpose the tubes 6, 7, $6^x$ $7^x$, alternate with the tubes 8, 9, $8^x$, $9^x$, and thus for part of their length the ends of the tubes 6, 7, and 8, 9, $6^x$ $7^x$ and $8^x$ $9^x$ are abreast of each other at their vertical ends. It is preferable to make the steam tubes $8^x$ $9^x$ at the ends to dip down into the combustion chamber 11 a lesser distance than the tubes $6^x$ $7^x$, as shown in Figs. 7 and 8, and so on with the tubes above, for this reason, that the lower tubes are exposed to greater heat than the upper ones, and therefore require less heating surface, while the tubes 6, 7, at the top dip down about twice as far as the bottom ones.

In Fig. 9, a double-deck oven is shown with the combustion chamber 11 heated by the combustion of gaseous or liquid fuel, by which means I believe the device will be heated in a better and more expeditious manner, and with results not hitherto found possible. The gaseous or liquid fuel is conveyed by pipes 24 to burners 25 located in the combustion chamber 11, which as before is made of earthenware or brickwork. 26 is the air supply opening and air for combustion is introduced by natural or by forced draft as required. The air and gas being allowed to mix, the combustion takes place at the point at which such combustion is desired. 27 is a bed of asbestos located immediately at the base of or in contact with the pipes, for protecting the pipes. The heat produced by the combustion of the gaseous or liquid fuel and air comes from one set of burners into contact with the vertical ends of one set of pipes, while the heat produced by the combustion of the gaseous or liquid fuel and air of the other set of burners comes into contact with the vertical ends of the other set of steam pipes.

I declare that what I claim is:—

1. The combination with bakers' and like ovens, of tubing formed of flow and return tubes joined together at the ends to form continuous circuits, the flow lengths descending through the oven chamber from the furnace, and the return lengths sloping at a suitable declivity back to the furnace, whereby it is only the portions of the pipes that are acted upon by the fire that rise upward.

2. In bakers' ovens, a series of closed circulating steam tubes for heating the same, a combustion chamber through which a portion of the said tubes extend longitudinally, burners located in the said chamber for heating the tubes, and beds of asbestos in contact with the tubes.

3. In a heating system for bakers' ovens, the combination with an oven having a combustion chamber at one end separated by a wall, provided with a series of vertical grooves, of a series of converging inclined tubes arranged in said oven adjacent its top and bottom, formed of flow and returning tubes, the ends of said tubes extending through said wall, and joined together within said groove to form continuous circuits, the flow tubes descending from the combustion chamber, and the return tubes to the combustion chamber.

In witness whereof, I have hereunto signed my name this 2nd day of July 1909, in the presence of two subscribing witnesses.

GEORGE LUNT.

Witnesses:
G. C. DYMOND,
WM. PIERCE.